United States Patent
Mehrl

(10) Patent No.: US 10,635,153 B2
(45) Date of Patent: Apr. 28, 2020

(54) METHOD, OPTICAL SENSOR ARRANGEMENT AND COMPUTER PROGRAM PRODUCT FOR PASSIVE OPTICAL MOTION DETECTION

(71) Applicant: ams AG, Unterpremstaetten (AT)

(72) Inventor: David Mehrl, Plano, TX (US)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 15/775,331

(22) PCT Filed: Nov. 9, 2016

(86) PCT No.: PCT/EP2016/077116
§ 371 (c)(1),
(2) Date: May 10, 2018

(87) PCT Pub. No.: WO2017/081068
PCT Pub. Date: May 18, 2017

(65) Prior Publication Data
US 2018/0348841 A1    Dec. 6, 2018

Related U.S. Application Data

(60) Provisional application No. 62/253,930, filed on Nov. 11, 2015.

(30) Foreign Application Priority Data

Dec. 14, 2015    (EP) .................................... 15199868

(51) Int. Cl.
*G06F 1/3231*    (2019.01)
*G06F 3/01*    (2006.01)
*G06T 7/246*    (2017.01)

(52) U.S. Cl.
CPC ............ *G06F 1/3231* (2013.01); *G06F 3/017* (2013.01); *G06T 7/248* (2017.01); *Y02D 10/173* (2018.01)

(58) Field of Classification Search
CPC ..... G06F 1/32321; G06F 3/017; G06T 7/248; Y02D 10/173; G06K 7/10722; G05D 1/0253; B60W 2420/42
See application file for complete search history.

(56) References Cited

U.S. PATENT DOCUMENTS 6,130,707 A * 10/2000 Koller .............. G08B 13/19602
                                                                340/511
2010/0066667 A1* 3/2010 MacDougall ...... G06K 9/00228
                                                                345/156

(Continued)

OTHER PUBLICATIONS

Wedel, A. et al.: "An Evaluation Approach for Scene Flow with Decoupled Motion and Position" Jul. 13, 2008, Statistical and Geometrical Apporaches to Visual Motion Analysis; pp. 46-69; XP019124572, ISBN: 978-3-642-03060-4.

*Primary Examiner* — Tom V Sheng
(74) *Attorney, Agent, or Firm* — Fish & Richardson P.C.

(57) ABSTRACT

A method for passive optical motion detection uses an optical sensor arrangement comprising an optical sensor having at least one signal channel. The optical sensor arrangement is initialized for repeated signal acquisition and an initial frame comprising a tuple of sensor data is collected from the at least one signal channel. The initial frame is set as a previous frame. A loop of motion detection is entered and the following steps are repeated. First, a current frame comprising another tuple of sensor data is collected from the at least one signal channel. Then, a motion parameter is computed from a motion metric depending on the current and previous frames. The so computed motion parameter is compared with a threshold value. A motion event parameter (Continued)

is set depending on the comparison of the motion parameter with the threshold value. The current frame is set as previous frame so that the loop can start all over again.

15 Claims, 7 Drawing Sheets

(56) References Cited

U.S. PATENT DOCUMENTS

| | | |
|---|---|---|
| 2010/0208063 A1 | 8/2010 | Lee et al. |
| 2013/0271397 A1* | 10/2013 | MacDougall ........... G06F 3/017 345/173 |
| 2014/0254870 A1* | 9/2014 | Tsukamoto ........ G06K 9/00355 382/103 |
| 2014/0254880 A1* | 9/2014 | Srinivasan ......... G06K 9/00335 382/106 |
| 2015/0210274 A1* | 7/2015 | Clarke .................. B60W 30/00 382/104 |
| 2015/0213318 A1* | 7/2015 | Einecke ............ G06K 9/00791 382/103 |
| 2015/0354976 A1* | 12/2015 | Ferencz ............. G01C 21/3602 382/104 |
| 2016/0012599 A1* | 1/2016 | Kuboyama ............. G06F 3/017 348/348 |
| 2016/0127624 A1* | 5/2016 | Woo ..................... H04N 9/3173 348/36 |
| 2017/0008521 A1* | 1/2017 | Braunstein ............. G01C 21/32 |
| 2017/0236337 A1* | 8/2017 | Devries ................ G06F 3/0304 345/419 |

* cited by examiner

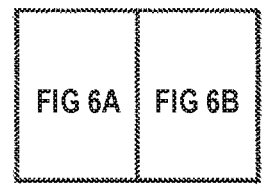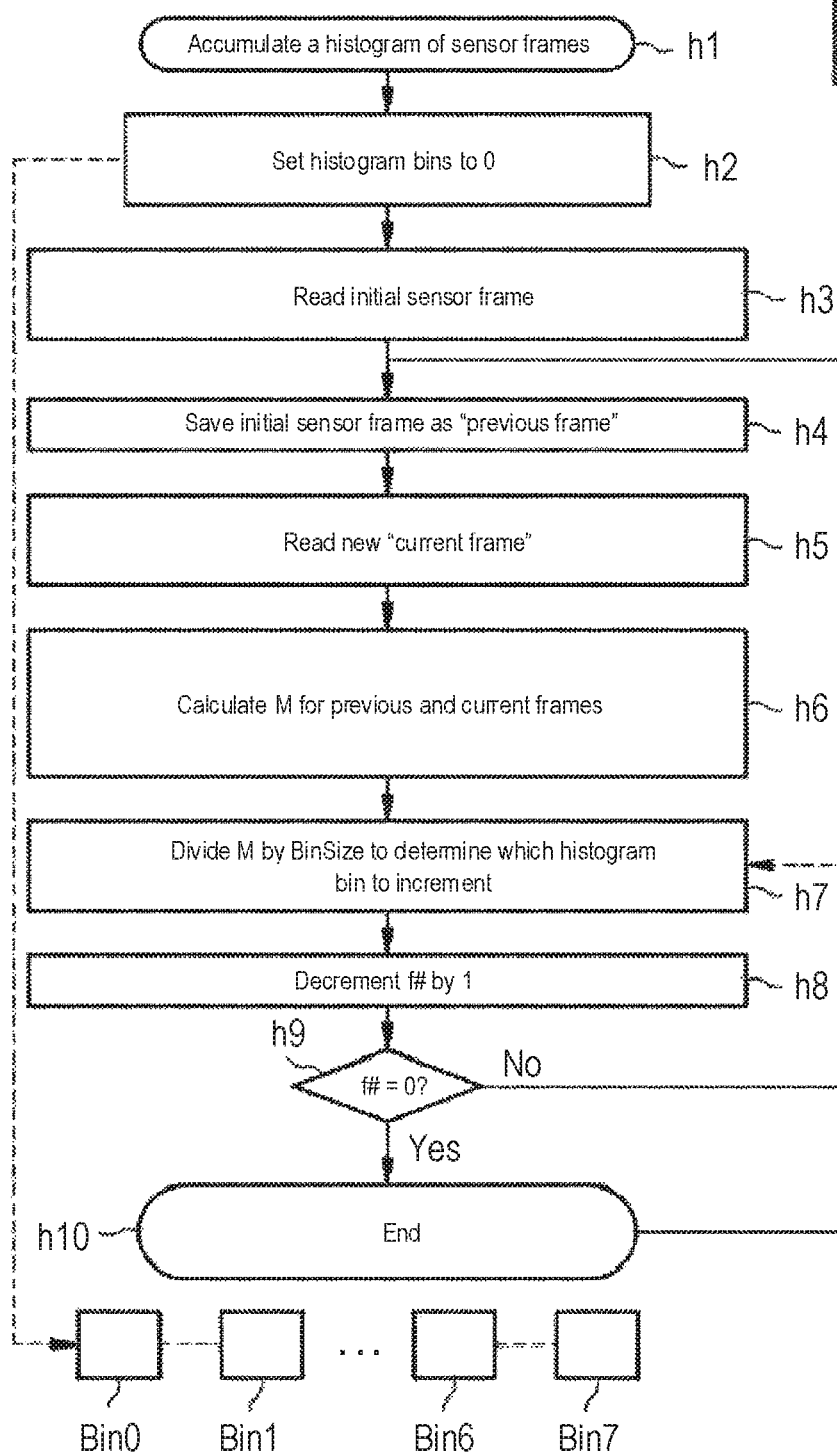

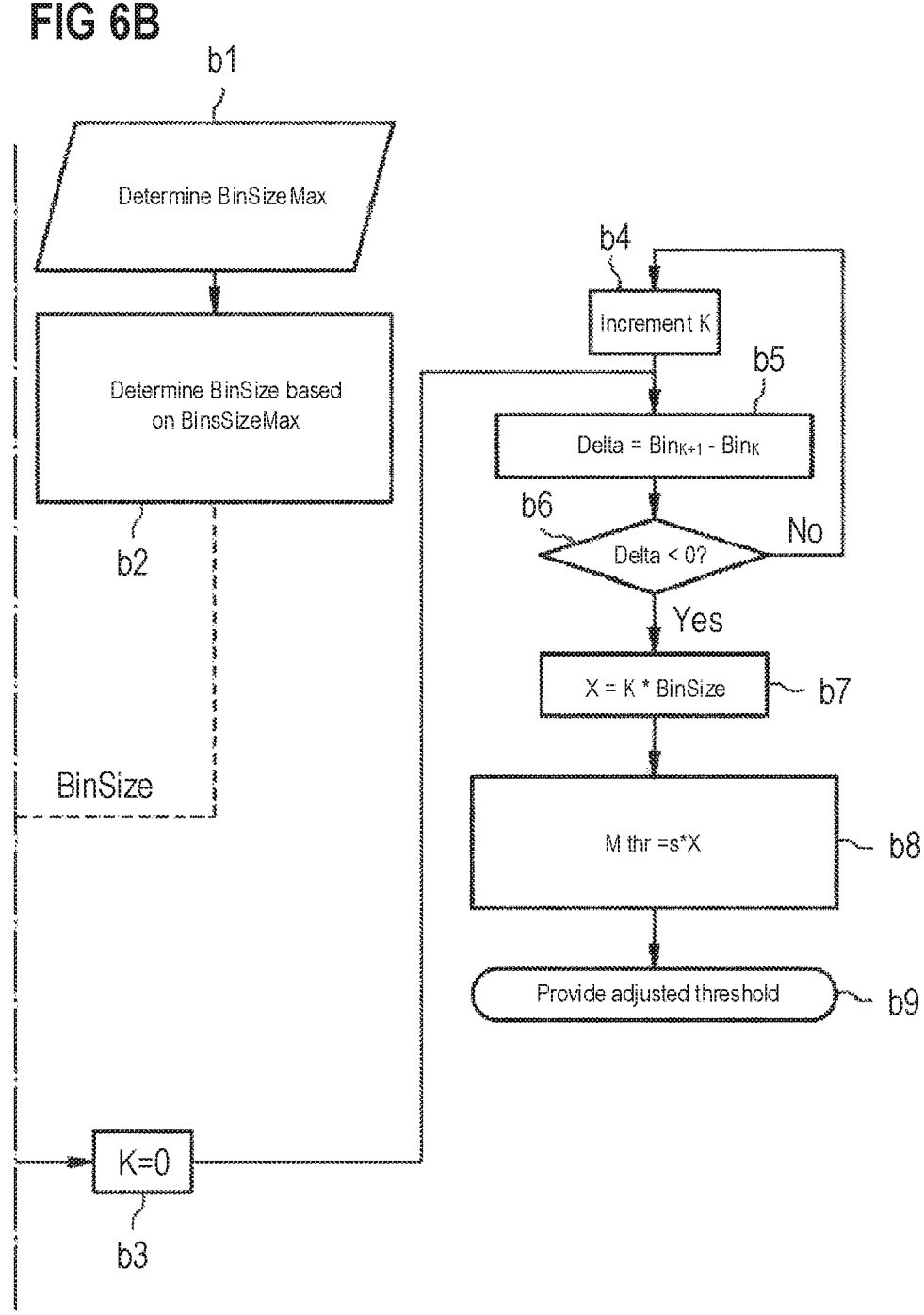

METHOD, OPTICAL SENSOR ARRANGEMENT AND COMPUTER PROGRAM PRODUCT FOR PASSIVE OPTICAL MOTION DETECTION

BACKGROUND OF THE INVENTION

Mobile devices such as smartphones or tablets are equipped with an ever increasing number of sensors. Optical sensors are used to measure and detect ambient light, colour, gestures and proximity of objects, for example. Data collected by the sensors can be used by applications running on the mobile device and offer a vast amount of functionality. At the same time mobile devices typically rely on batteries as a power supply which only have limited capacity.

Not all components of a mobile device or the device itself need to be active at all times. In fact, there is an increasing demand in the market for a long range proximity sensor in order to wake up electronic devices such as computer monitors, laptops, printers, soda dispensers, and many others. One general motivation for "waking up" an electronic device from a "sleep" mode, is to save power. Another application is presence detection in a room to automatically turn off or on the device and/or lights in the absence or presence of motion.

Active proximity or gesture detection usually requires infrared light emitting diodes (IR LEDs) to emit pulses of light towards a potential target. Periodic polling must be done at all times to acquire a new proximity or gesture event. It is clear that this draws considerable power from the mobile device's batteries. Furthermore, active optical proximity and gesture sensors often have limited range. The typical useful range is only about 100 mm to 150 mm.

Passive proximity motion or presence detection offers much greater detection distance than existing optical or infrared proximity detection, while consuming considerably less power. If passive motion detection is used, motion events can be used to wake up the proximity and/or gesture sensors in the mobile devices so they only draw power when needed. This can save considerable power as there is no emission of light and no need for periodic polling and motion could be sensed at a considerably longer range while using little power.

Proximity infrared (PIR) sensors typically are used for passive motion and presence detection. At the core of a PIR sensor is a solid state sensor or set of sensors, made from pyroelectric materials, i.e. materials which generate energy when exposed to heat. Such sensors generate a temporary voltage when they are heated or cooled. However, PIR sensors typically cost considerably more than optical devices and are not nearly as compact.

SUMMARY OF THE INVENTION

In at least one embodiment a method for passive optical motion detection uses an optical sensor arrangement comprising an optical sensor. The optical sensor is arranged for providing at least one signal channel, for example as a function of light incident on the optical sensor. The method comprises at least the steps discussed below. In general, the method can be executed as software, e.g. on a control unit such as a microprocessor, or can be implemented as hardware components of an analog or digital integrated circuit, e.g. by means of logical units such as arithmetic units.

As a first step the optical sensor arrangement is initialized and set for repeated signal acquisition. For example, this may involve setting of parameters and/or variables of the optical sensor arrangement such as gain and integration time to operate the optical sensor. Furthermore, typically all parameters and/or variables, discussed below, are typically reset in order to prepare a defined initial state.

In a next step, an initial frame is acquired from the optical sensor, e.g. using the at least one signal channel. A frame of the optical sensor comprises a tuple of sensor data which is collected from the at least one signal channel. The term "tuple" is used to indicate that the optical sensor may collect data from more than a single signal channel. The tuple as understood hereinafter comprises one or more components which can be attributed to respective signal channels, for example red, green, blue and clear. Thus, the tuple is a finite ordered list of sensor signal or signals acquired from the optical sensor, e.g. using one or more signal channels. The initial frame is then set as a previous frame in order to define an initial state for a loop of motion detection and corresponding calculations.

After preparing the initial state, the loop of motion detection is entered. The steps executed in the loop, or repeated within the loop, are discussed below. These steps will be repeated until an end condition is reached or the operation is terminated by other events such as user intervention or power shutdown, for example.

In the loop, a current frame is acquired comprising another tuple of sensor data collected from the at least one signal channel. A motion parameter is computed by evaluating a motion metric depending on the current and previous frames. The motion metric can be described as a function of sensor data. Generally, a metric or distance function is a function that defines a distance value between each pair of elements, e.g. the current and previous frames or their respective tuples. The computed motion parameter is compared with a threshold value. Depending on the comparison of the motion parameter with the threshold value a motion event parameter is set. For example, the motion event parameter may be a binary value such as "0" indicating no motion event and "1" indicating that a motion event has been detected. Before the loop starts all over again, the current frame is set as the previous frame and another current frame can be acquired.

In at least one embodiment the optical sensor comprises multiple signal channels. Correspondingly, the collected tuples, i.e. current and previous frames, comprise multiple components. Each component can be associated to one of the multiple signal channels of the optical sensor. In fact, the step of computing the motion parameter is done by evaluating the motion metric component by component. For example, a color sensor comprises multiple signal channels which detect light of different colors such as red, green, blue, and/or clear. Another example for a multiple signal channel are gesture sensor having multiple photo-diodes which detect light in a direction sensitive manner. Different directions can be attributed to different signal channels such as x-up, x-down, y-up, y-down etc.

In at least one embodiment the motion metric involves taken absolute difference of the tuples of current and previous frames.

In at least one embodiment the motion metric involves taking a square root of the squared difference of the tuples of current and previous frames.

In at least one embodiment the motion metric involves taking a squared difference of the tuples of current and previous frames.

In at least one embodiment the motion parameter results from summing intermediate results from evaluating the motion metric component by component.

In at least one embodiment the motion event parameter is set or defined to indicate the motion event if the motion parameter is greater or equal than the threshold value. Furthermore, the motion event parameter is set or defined to not indicate the motion event if the motion parameter is smaller than the threshold value.

In at least one embodiment the threshold value is set manually, e.g. by estimating a random noise in the sensor data. Alternatively, the threshold value is set automatically in an auto calibration routine, e.g. depending on a lighting condition.

In at least one embodiment the auto calibration routine involves the following steps. First, a threshold parameter is determined by taking a median or average of a predetermined number of successive frames of sensor data. In the following, a standard deviation of the threshold parameter is calculated. Finally, the threshold value is defined as a sum of the threshold parameter, such as median (averaged) value, and one (or more) standard deviations.

In at least one embodiment the auto calibration routine involves the following steps. The threshold parameter is determined by taking a mode of a predetermined number of successive frames sensor data. The threshold value is then defined as a multiple of the mode. The multiplier to calculate the multiple of the mode typically assumes a multiplication value that is significantly greater than one, such as 2.0, 2.5, or 3.0 etc.

In at least one embodiment the auto calibration routine involves the following steps. A histogram is accumulated based on successive motion parameters. A peak value is then determined in the histogram. The peak value is set or defined as multiple of the mode of the predetermined number of successive frames of sensor data. The multiplier to calculate the multiple of the mode typically assumes a multiplication value that is significantly greater than one, such as 2.0, 2.5, or 3.0 etc.

In at least one embodiment of an optical sensor arrangement for passive long-range motion detection comprises an optical sensor and a control unit. The optical sensor is arranged for acquiring consecutive frames of sensor data, e.g. initial, current and previous frames. The control unit is connected to the optical sensor, for example to a sensor output. The control unit is arranged to perform a passive optical motion detection from the consecutive frames of sensor signals.

An "optical sensor" or photonic sensor within the meaning of this document will be considered an electronic detector that converts electromagnetic radiation, or a change in electromagnetic radiation, into an electronic signal or sensor data. Typically such sensors are based on semiconductors with narrow band gaps having a property called photoconductivity, in which the electrical conductance varies depending on the intensity of radiation striking the material. Incident photons can induce electronic excitations. The term "optical" denotes that the optical sensor is sensitive to electromagnetic radiation from the (near) infrared, visual and/or UV part of the spectrum. Examples include photodiodes, bipolar phototransistors, and photoFETs (photosensitive field-effect transistor) or the like. Optical sensors and the optical sensor arrangement may not include image sensors such as CCDs or APS CMOS. For example, the one or more signal channels of the optical sensor arrangement could be attributed to more than one optical sensor. For example, an optical sensor may have red R, green G, blue B and clear C) signal channels which originate from four respective R, G, B, C photodiodes. However, there could also be an implementation wherein eight respective R, G, B, C photodiodes are combined into the four red, green, blue and clear (R, G, B and C) signal channels, for example.

The optical sensors according to the presented concept are to be distinguished over proximity infrared (PIR) sensors which often are used for passive motion and presence detection. These sensors are based on pyroelectricity and generate a temporary voltage when they are heated or cooled. A change in temperature eventually modifies positions of atoms within the crystal structure of the sensor material such that the polarization of the material changes. This polarization change gives rise to a voltage across the crystal.

In at least one embodiment the optical sensor comprises a single signal channel sensor. Furthermore, the optical sensor may comprise a multiple signal channel sensor, an array of several single and/or multiple signal channels sensors. In particular, the optical sensor may have one or more gesture sensors or one or more color sensors.

In at least one embodiment the control unit comprises a microcontroller, an application specific integrated circuit (ASIC), a signal processor, and/or the logic array arranged for executing the passive motion detection according to the concept discussed above.

In at least one embodiment a computer program product comprises a program code to be executed in a control unit connected to an optical sensor. When executed the program code performs steps of at least one embodiment of a method for passive motion detection according to the concept discussed above.

The optical sensor arrangement for passive motion detection, the method for passive optical motion detection using an optical sensor arrangement and the computer program product address several shortcomings of the prior art and allow for easy and compact implementation. The concept discussed above allows for implementing passive motion detection which consumes less power and does not need a hybrid module to provide LED illumination, for example. The methods make use of ambient or visible light so that detection does not require illumination with a power consuming LED. One further advantage lies in its capability of detecting motion/presence at large distances.

Both existing and specially adapted optical sensors can be used to implement passive motion detection. Detection can be demonstrated to work well in detecting movements of a person out to four feet in ordinary office lighting conditions even without additional optics. Optionally proximity detectors can be used in conjunction with passive motion detection in various ways, such as using motion detection to "wake up" a proximity or gesture detector capable device, hence saving significant power.

Passive motion detection can be executed by implementation of suitable algorithms to process color (CRGB) signals in real time. Optionally the computations necessary to detect motion/presence could be implemented as hardware with on-chip logic in a modified optical sensor. This could e.g. be culminated by having the sensor assert an interrupt when motion is detected. Implementation in software is possible as well.

In the following, the concept presented above is described in further detail with respect to drawings, in which exemplary embodiments are presented.

BRIEF DESCRIPTION OF THE DRAWINGS

FIG. 6 shows an embodiment of an auto-calibration routine for determining a threshold value.

DETAILED DESCRIPTION

Figure 1:
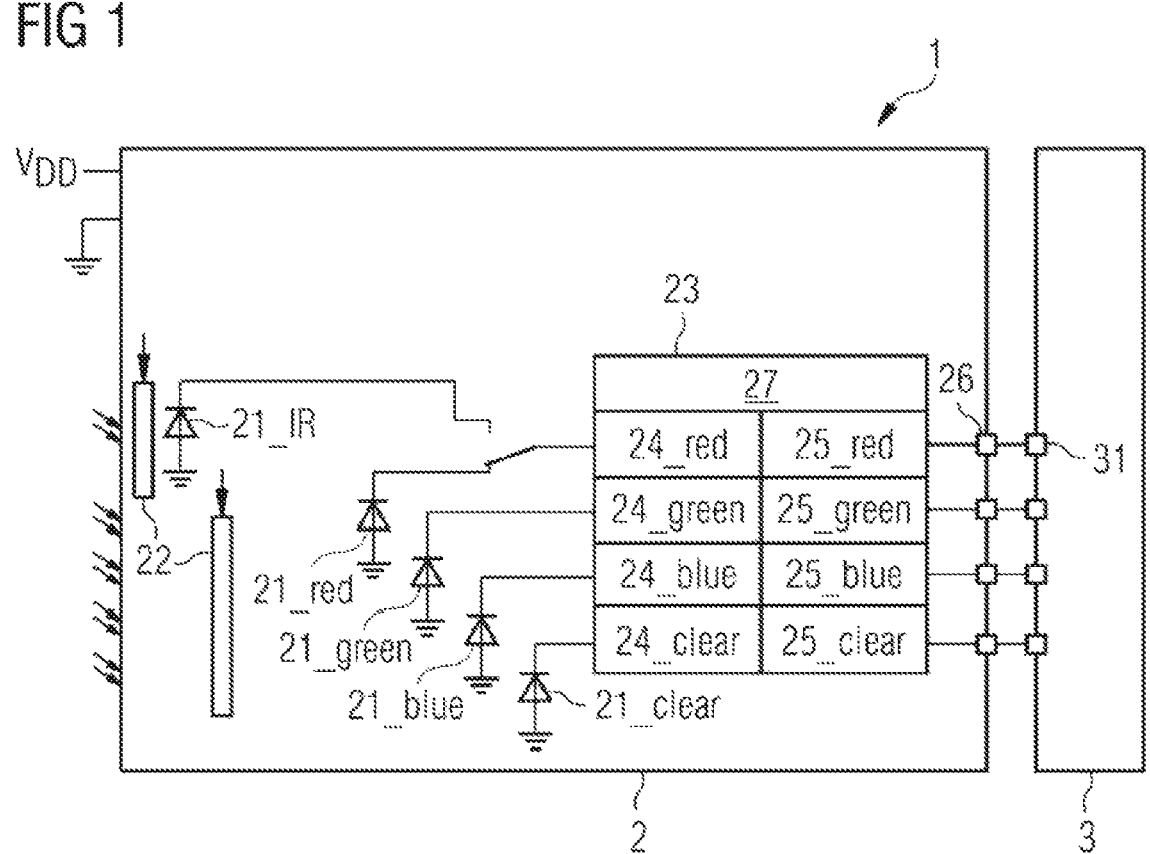
FIG. 1 shows an embodiment of an optical sensor arrangement for motion detection.

FIG. 1 shows an optical sensor arrangement 1 for motion detection. The arrangement 1 comprises an optical sensor 2 (or photonic sensor) and a control unit 3. Generally, the optical sensor arrangement 1 can be integrated into a single integrated circuit. However, both optical sensor 2 and control unit 3 could also be arranged on separate integrated circuits. For example, the control unit 3 can be part of an external device such as a computer or a microcontroller board. As an optional component a lens can be arranged in front of the optical sensor 2.

In this particular embodiment the optical sensor 2 is a color sensor. The optical sensor comprises several photodiodes: a red photodiode 21_red, a green photodiode 21_green, and a blue photodiode 21_blue being sensitive within a red, green, blue spectral window, respectively. A further clear photodiode 21_clear is sensitive to a larger spectral window within the visual part of the electromagnetic spectrum. Furthermore, the optical sensor 2 has an optional infrared photodiode 21_IR being sensitive to the (near) infrared part of the spectrum.

Typically, the photodiodes are arranged behind a color filter 22 which blocks certain electromagnetic radiation from reaching the photodiodes. For example, the color filter 22 blocks UV and/or infrared. Instead of photodiodes with a dedicated sensitivity in the red, green, blue or over a larger integral part of the electromagnetic spectrum the individual photodiodes can be arranged with several color filters. These filters may be band pass filters having a defined spectral transmission in the red, green, and blue or over a larger spectral window and, thus, define the spectral sensitivity of the associated photodiodes. For example, the color filters can be similar to a Bayer matrix or the like. Of course other wavelengths and number of filters are possible.

The optical sensor 2 further comprises a signal processing unit 23. The signal processing unit 23 has means for analog-to-digital conversion, for example one or more analog-to-digital converter or light-to-digital converters. The photodiodes are connected to the means for analog-to-digital conversion. In particular, the red, green, blue and clear photodiodes are each connected to dedicated red, green, blue and clear analog-to-digital converter 24_red, 24_green, 24_blue, 24_clear. Alternatively, the connection of the photodiodes can also be achieved by means of a multiplexer operated in a time divisional manner.

Furthermore, the signal processing unit comprises means for integrating sensor signals, for example a register, counter, microcontroller or the like. In particular, the red, green, blue and clear analog-to-digital converters are connected to red, green, blue and clear signal integrators 25_red, 25_green, 25_blue, 25_clear, respectively. However, the means for analog-to-digital conversion and means for integrating sensor signals can be implemented as a single component, for example as an integrating analog-to-digital converter.

Finally, the signal processing unit comprises the controller unit for setting of parameters and/or variables of the optical sensor arrangement such as gain and integration time to operate the optical sensor. The red, green, blue and clear signal integrators are connected to the control unit via respective terminals 26, 31.

In operation the optical sensor arrangement, in particular the colour sensor provides red, green, blue and clear (or RGBC) light sensing. Hereinafter the particular photodiodes will be referred to as sensor channels, e.g. a red, green, blue and clear sensor channels. The red, green, blue and clear sensor channels acquire respective sensor signals depending on a given integration time. The data acquisition and integration is controlled by means of a control section 27. The sensor signals are integrated and converted into digital values. These digital values are made available as sensor data. In particular, the sensor data comprises a red, green, blue and clear sensor data components corresponding to the red, green, blue and clear sensor channels, respectively. This way a tuple R, G, B, and C of sensor data is established and can be evaluated component by component. A tuple of sensor data will be considered a sensor frame or frame hereinafter.

The control unit 3 is adapted to execute a method for optical motion or presence detection. Various algorithms for motion detection can be used, in conjunction with different optical sensors, such as the color sensor of FIG. 1, in order to enable robust optical detection of motion or presence. In the following, different algorithms will be presented in general terms and then explained in further detail in the context of flowcharts, for example. Basically, the steps disclosed in the flowcharts can be implemented as a computer program product or by means of an integrated circuit as discussed above.

In general terms, the algorithms for motion detection determine changes between successive frames acquired by the optical sensor. Such changes indicate a presence or motion of an object. Mathematically the change is described by a motion metric function, for example, as a difference of successive frames, with the constraint that any "difference" is always positive, i.e. never negative valued. The optical sensor or colour sensor is sampled in a periodic fashion, successively collecting tuples of C, R, G, B values in each frame. Integration time is typically chosen to be an integer multiple of 50 msec to provide flicker rejection.

For example, flicker is typically a periodic light intensity fluctuation resulting from the 50 Hz or 60 Hz voltage level fluctuations typical of an AC line voltage that powers most light sources. Frequencies of 50 Hz and 60 Hz are commonplace, e.g. in the US and in many European countries, respectively. For example incandescent lights typically have a periodic flicker frequency at 120 Hz in the US, or 100 Hz in many European countries, and fluorescent lights with older style electric ballasts typically have flicker frequencies of both 60 Hz and 120 Hz in the US, or 50 Hz and 100 Hz in many European countries.

In one algorithm the motion metric function is a sum of absolute values of the differences between successive frames for each signal channel. The motion metric function is evaluated for two successive frames component by component and yields a motion parameter M. If the overall change, i.e. the motion parameter M, exceeds a predetermined threshold $M_{thr}$, a motion event is detected. This motion event is typically "latched" for some period of time to denote a detected presence or motion.

Variations to this general concept are possible. However, the possible embodiment is the following, which may benefit from simplicity and relative ease of implementing it in hardware. Let $(CRGB)_{-1}$ denote a previous frame, and let $(CRGB)_0$ denote a current frame acquired by the optical sensor 2. C, R, G and B denote components of a tuple of sensor data, e.g. as counts (integer numbers), sampled from the clear, red, green and blue signal channels 21_red, 21_green, 21_blue, 21_clear, respectively. In this nomenclature $R_{-1}$ is representing the red signal channel component from the previous frame, $R_0$ being the red signal channel value from the current frame, $B_0$ being the blue signal channel value from the current frame etc.

The motion parameter M is calculated as follows, and then compared to the predetermined threshold value $M_{thr}$ to see if a motion event has been triggered. Detected motion events are latched for some prescribed time, with the output of the latch being designated as a motion event parameter or signal P. Typically the motion event parameter P denotes detection of a presence in a room or in front of a device such as a computer monitor. The following assumes that the threshold is predetermined, i.e. has already been chosen before executing of the method for optical motion or presence detection.

A possible embodiment of the algorithm discussed above can be summarized as follows.

1.) Setup: Set up the gain, integration time etc. of the optical sensor arrangement. Power on and enable the optical sensor function. Set motion event parameter to false or zero, i.e. P=0.

2.) Setup: Read a frame of sensor data $(CRGB)_0$ as an initial frame to define a starting condition to begin the sampling loop process.

3.) Beginning of Loop: Set the initial frame as previous frame, i.e. let $C_{-1}=C_0$, $R_{-1}=R_0$, $G_{-1}=G_0$, and $B_{-1}=B_0$, or equivalently let $(CRGB)_{-1}=(CRGB)_0$.

Sample another frame of sensor data (CRGB) and set this frame as current frame $(CRGB)_0$, with the individual components being $C_0$, $R_0$, $G_0$ and $B_0$.

4.) Compute motion parameter M by evaluating the motion metric function:

$M=|R_0-R_{-1}|+|G_0-G_{-1}|+|B_0-B_{-1}|+\frac{1}{2}|C_0-C_{-1}|.$

Please note that the clear channel difference $|C_0-C_{-1}|$ is divided by a factor 2 to provide some degree of "equalization", because the clear channel signal is much larger than the R, G and B channel signals.

5.) Compare the calculated motion parameter M to the predetermined threshold value $M_{thr}$. If $M<M_{thr}$ then no motion has been detected. Alternately, if $M \geq M_{thr}$, then a motion event is triggered. The event of motion is indicated by setting the motion event parameter P, e.g. P=1 or true. The motion event is typically latched and held active for a certain period of time to signal presence or motion. If a certain period of time elapses with no successive motion events detected, then the latched motion event parameter P is reset to zero, i.e. P=0.

6.) End of Loop: Loop back to step 3.) above. An optional "idle" or "wait" state is typically inserted here to save power consumption, since it is not necessary to fast sample in order to detect motion.

Typically setting of the motion event parameter to P=1, might be used to e.g. wake up a device such as a computer and bring it out of screen saver mode, for example. Setting of the motion event parameter to P=0 might be used to place the device or computer into sleep/screen-saver mode.

Several variations are possible. For example, the motion metric function can be changed to a different metric. Examples include square root of a squared difference:

$$M = \sqrt{|R_0-R_{-1}|^2 + |G_0-G_{-1}|^2 + |B_0-B_{-1}|^2 + \left(\frac{1}{2}|C_0-C_{-1}|\right)^2},$$

with $M>M_{thr}$ as the motion detection criterion.

A computationally simpler but equivalent criterion obtained by squaring both sides of the above equation to eliminate the square root operator:

$M=(R_0-R_{-1})^2+(G_0-G_{-1})^2+(B_0-B_{-1})^2+(\frac{1}{2}|C_0-C_{-1}|)^2,$ with criterion $M>M2$, where $M2=M_{thr}^2$.

Figure 2:
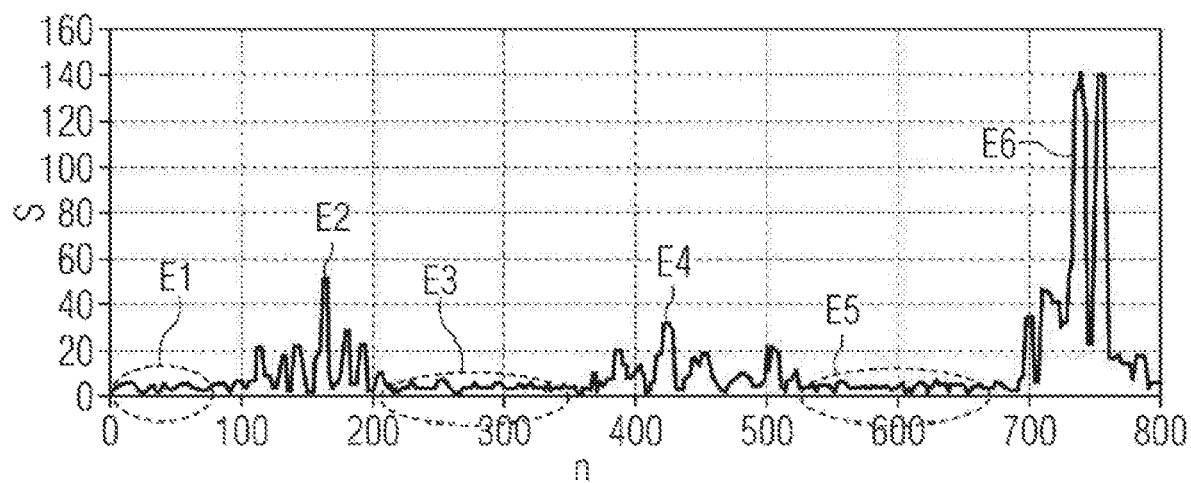
FIG. 2 shows an exemplary plot of a motion parameter as a function of sample number.

FIG. 2 shows an exemplary plot of a motion parameter as a function of sample number n. The plot depicts a time series sample number of successive frames on the X-axis and the motion parameter M in terms of the signal response S (in counts) on the Y-axis. Several events are indicated in the graph and discussed below. The samples used for this graph have been recorded with an optical sensor arrangement 1 according to FIG. 1 without the use of an additional lens.

A first event E1 shows a period of no motion. At event E2 a motion event is triggered which, in this example, was due to gentle rocking of a person in a chair at a distance of three feet from the detector. Event E2 was followed by a period of no motion E3. Event E4 began as the result of gently rocking of a person in a chair in the proximity to the optical sensor arrangement. Event E4 was followed by another period of no motion E5. Event D6, however, shows a higher signal amplitude and was the result of more aggressive arm waving at about two feet distance from the optical sensor arrangement.

These results demonstrate that the proposed optical sensor arrangement 1 and method for optical motion detection works well even at large distances to moving objects much larger than those detectable by active optical proximity sensors. Experiments revealed accurate detection at six to eight feet (1 to 2 m) with no lens, i.e. with a very wide field of view. With no lens the optical sensor arrangement 1 is also very effective at detecting motion/presence at large off-axis angles. With a simple lens the distance can be extended significantly, albeit with a reduced angular field of view. Detection range is even further extended if the optical sensor arrangement is used in an "interrupter mode", where it is pointed e.g. at a window, and a person "interrupts" the light path by passing between the light source (i.e. window) and the optical sensor. In such an interrupter mode the detection is robust with capabilities of detecting motion at distances much larger than 8 feet or 2 m. Please note that the results presented above have been taken at a less desirable situation that might represent an office with no windows and overhead lighting, where it is only possible to detect objects moving against a diffusely reflecting background such as an office wall reflecting the overhead lights.

One further mechanism for enhancing optical motion detection (not shown) is the ability, e.g. to image "edges" of a moving object (such as a person's body) onto an array of differentiated or separated sensors, multi-channel sensors or arrays of multi-channel sensors. Further differentiating by colour appears to be robust and the optical sensor arrangement can be multipurpose in that in addition to detecting motion and presence, it can detect colour, colour temperature, and perform ambient light sensing.

However, functionality might be further enhanced, e.g. by rearranging the colour sensor array along an axis rather than in a two dimensional array. This enhances detection of horizontal motion over vertical motion. Most motion of humans would occur horizontally rather than vertically, for example. This can be accomplished, e.g. by multiplexing colour elements in different ways to sense along vertical columns in the array when detecting motion or by adding the signals of all optical sensors in a column, instead of simply summing all sensor signal channels. In a multipurpose sensor different modes can be implemented, e.g. when reading colour in a colour sensor the signal channels of similar colour are summed, but while sensing motion, signals channels are summed along a common column. For example, there are four columns of sensors in a typical 4×4 colour array. Of course, optical sensors can have more than four colour signal channels and would offer an even better potential for motion sensing than a four colour signal channels sensor.

Figure 3:
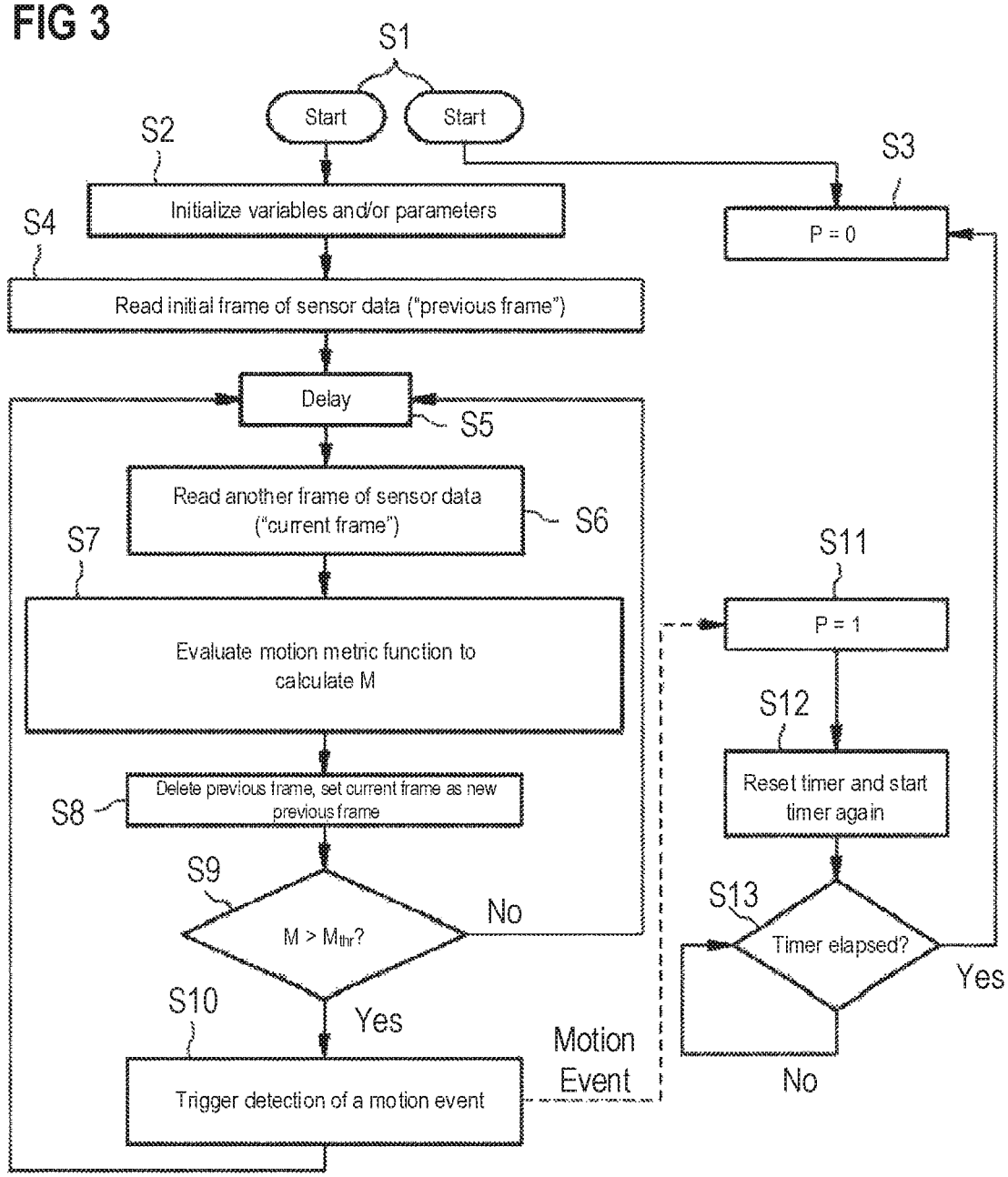
FIG. 3 shows an embodiment of a method for optical motion detection.

FIG. 3 shows an embodiment of a method for optical motion detection. The flowchart depicted in the graph can be implemented as an integrated circuit, for example as an ASIC, by logical or arithmetic components. However, the steps summarized in the flowchart can also be implemented as software running on a control unit, such as a microprocessor, microprocessor board or personal computer.

For an easier representation the flowchart is separated into two parts. The left side shows the steps of optical motion detection. The right side shows the initialization and setting of the motion event parameter P. This parameter can be read out by further components or routines of the software in order to trigger a motion activated event such as turning on the device such as a computer monitor. In a certain sense the motion event parameter P constitutes the result and output of the optical motion detection.

The method for optical motion detection is started or initialized in step s1. A setup involves initializing variables and/or parameters to be used during the execution of the method (step s2). Furthermore, the optical sensor arrangement is also initialized and variables and/or parameters such as integration time and sensor again are set. During the setup in step s3 the motion event parameter P is set to false or 0, which indicates that no motion is present. In step s4 an initial frame of sensor data is read from the optical sensor embedded in the optical sensor arrangement. This initial frame is defined as a previous frame.

The following steps of optical motion detection can be executed in a loop and are continuously or repeatedly executed. After the setup has been finalized in step s4 the method enters the loop and is first delayed in step s5. The delay typically lasts for several milliseconds. In the following step s6 another frame of sensor data is read from the optical sensor. The frame is saved or set as a current frame.

In step s7 a motion metric function is evaluated in order to calculate the motion parameter M. The motion metric function may include at least one of the metric functions introduced above. Basically, the motion metric function involves taking the difference between the previous and current sensor frames. By evaluating the motion metric function component by component the motion parameter M is determined. In step s8 the previous frame used in step s7 for the calculation of the motion parameter M is deleted and the current frame is set as a new previous frame.

Step s9 involves the comparison of the calculated motion parameter M and the threshold value M. Depending on the comparison either the loop continues back with step s5 or continues with step s10. The comparison involves a comparison criterion and can be set and adjusted according to the field of application. Typically, if the calculated motion parameter M is greater than the threshold value M the detection of a motion event is triggered in step s10 and the loop returns back to step s5. If, however, the calculated motion parameter M is equal or smaller than the threshold value $M_{thr}$ then the loop returns back to step s5 directly.

If the comparison in step s9 has led to triggering a motion event in step s10, the motion event parameter P is set from false to true, e.g. set from P=0 to P=1 (see step s11). Then in step s12 a timer is reset and started over again. The timer is used for latching the execution of optical motion detection for a predetermined amount of time (see step s13). After the timer has been elapsed in step s13 the motion event parameter P is again set to false or P=0 indicating that no motion is present. If in the meanwhile from repeating the steps of the loop another motion event is triggered, the latching due to the timer can be interrupted and started over again indicating a new motion event.

Figure 4:
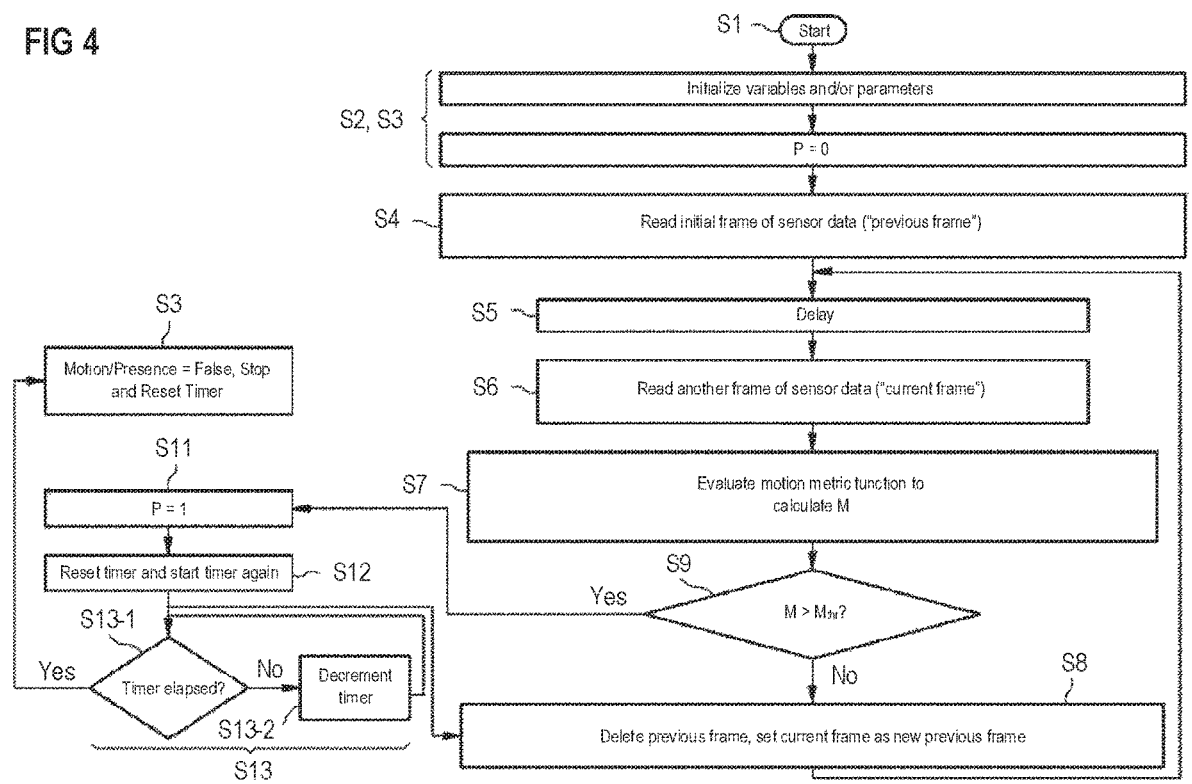
FIG. 4 shows another embodiment of a method for optical motion detection.

FIG. 4 shows another embodiment of a method for optical motion detection. This embodiment is based on the one presented in FIG. 3 but will be presented in more detail in view of a possible implementation in a microcontroller or software.

The procedure starts again with step s1 and is followed by initialization of variables and parameters in steps s2 and s3. First, the motion event parameter P is set to false, the timer is set to the predetermined amount of time TimeOutPeriod, and the threshold value is set to its predetermined value Mthr. Furthermore, the optical sensor arrangement is initialized, i.e. gain, integration etc. are set and the device is powered up.

In step s4 sensor data in terms of counts is read from the optical sensor and the respective signal channels Red_Count, Green_Count, Blue_Count, and Clear_Count are saved as a previous frame comprising a tuple of sensor data Red_Save, Green_Save, Blue_Save, and Clear_Save:

Red_Save=Red_Count,

Green_Save=Green_Count,

Blue_Save=Blue_Count,

Clear_Save=Clear_Count,

The delay of step s5 is set to DelayWait. The delay is dependent on the sampling period Ts which in turn depends on the integration time set for the optical sensor. In step s6 the current frame Red_Count, Green_Count, Blue_Count, Clear_Count is read from the optical sensor.

In step s7 the motion parameter M is calculated from the previous frame Red_Save, Green_Save, Blue_Save, Clear_Save and the current frame Red_Count, Green_Count, Blue_Count, Clear_Count using the motion metric function. The motion metric function in this particular embodiment involves taking the sum over absolute values abs( ) from frame differences:

$$M = \text{abs}(\text{Red\_Count} - \text{Red\_Save}) + \text{abs}(\text{Green\_Count} - \text{Green\_Save}) +$$
$$\text{abs}(\text{Blue\_Count} - \text{Blue\_Save}) + \text{abs}(\text{Clear\_Count} - \text{Clear\_Save}).$$

Steps s8 and s9 are interchanged when compared to the embodiment of FIG. 3. The comparison of step s9 is executed before step s8, i.e. if M>Mthr than continue with step s12 or else continue with step s8. In step s8 the current frame is saved as previous frame, i.e.

Red_Save=Red_Count,

Green_Save=Green_Count,

Blue_Save=Blue_Count,

Clear_Save=Clear_Count.

From step s8 the optical motion detection returns back to step s5.

If the comparison in step s9 indicates motion the motion event parameter P in step s12 is set to True. The timer is reset and started in step s13. In addition, motion detections continues with step s8, i.e. the current frame is saved as previous frame. After starting the timer step s14 involves a subroutine (step s14_1) that determines whether the timer has expired or not. If no then the timer is decremented in step 14_2 and returns to step 14_1 until the timer has expired. If the timer has expired step s3 is executed and the motion event parameter P is set to False and the timer is stopped and reset.

In another embodiment (not shown) the method for passive optical motion detection can be implemented as software. The following Table 1 comprises a source code example for programming an Arduino microprocessor board.

TABLE 1

Exemplary Arduino source code

```
// Arduino code depicting integer-based arithmetic that could be performed
by on-chip silicon logic
// Motion detect event asserted if:
// [abs(dC)/2 + abs(dR) + abs(dG) + abs(dB) ] > Threshold
// --------------------------------------------------------------------------------
// --------------------------------------------------------------------------------
// find deltas by doing subtraction
    dC = Clear_Count-Clear_Save;
    dR = Red_Count-Red_Save;
    dG = Green_Count-Green_Save;
    dB = Blue_Count-Blue_Save;
// take absolute values by testing to see if result is
// negative. If it is then negate it again to make it
// positive
    if (dC<0) { dC = -dC; }
// this can be implemented in silicon logic by taking
// two's complement - i.e. bitwise
    if (dR<0) { dR = -dR; }
// complement followed by adding one
    if (dG<0) {dG = (dG ^ 0xFF) + 1;}
// <-- an example of negating using 2's complement
// arithmetic // in Arduino
    if (dB<0) {dB = -dB; }
    M = dC + dR + dG + dB;
    Mthr=8;
// this threshold may need to be adjusted for
// various lighting conditions, integration
// time/gain settings, part-to-part variation etc.,
// e.g. by an initial calibration routine.
// turn on LED to alert of a motion detection event
    if (M > Mthr){digitalWrite(ExtLED,HIGH);}
```

TABLE 1-continued

Exemplary Arduino source code

```
// turn off LED --- no motion detected on this frame.
    else {digitalWrite(ExtLED,LOW);}
// save CRGB signals as Red_Save, Green_Save, Blue_Save,
// Clear_Save, then read in the new Red_Count, Green_Count,
// Blue_Count, Clear_Count values.
// Then loop back and repeat this process ad infinitum.
```

Figure 5:
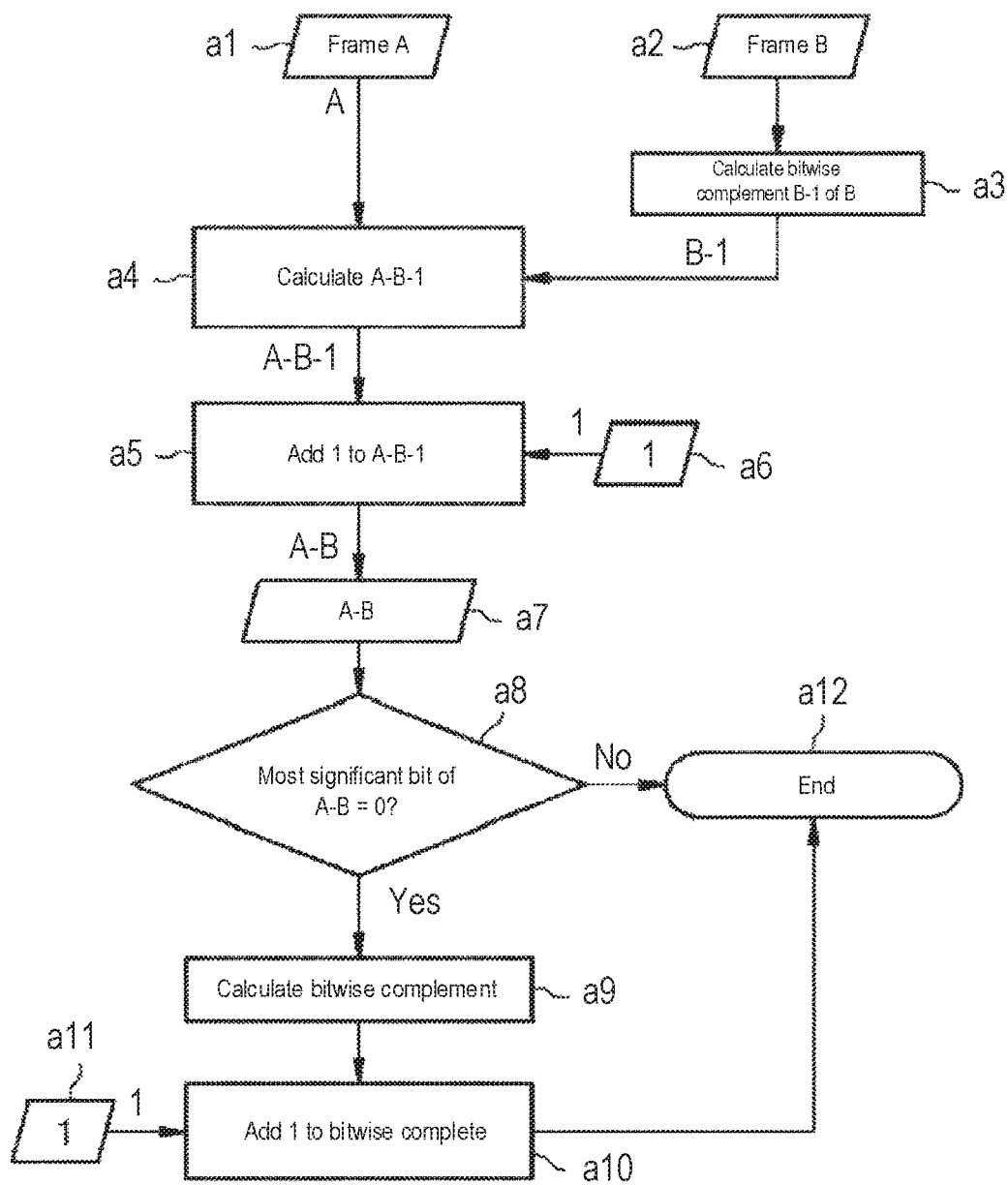
FIG. 5 shows an exemplary embodiment of implementing a calculation of an absolute difference.

FIG. 5 shows an exemplary embodiment of implementing a calculation of an absolute difference. The flowchart depicts a simplified algorithm for evaluating an absolute value of difference for a pair of sensor frames, i.e. tuples of sensor data. The steps described below can be implemented in hardware, for example in an ASIC or microcontroller, or in software running on a control unit such as a microcontroller or personal computer.

The proposed algorithm assumes a first sensor frame A and a second sensor frame B (see steps a1 and a2). For example, the first and second sensor frames can be the previous and current frames discussed above. As an example the sensor frames comprise 16 bit of sensor data. Subtraction of sensor frame A and a second sensor frame B is implemented using two's complement arithmetic. First, in step a3 a bitwise complement B-1 of sensor frame B is calculated. Sensor frame A and the bitwise complement B-1 of sensor frame B can be then be added by an adder logic (step a4) to result in A-B-1, for example by using a 16-bit adder logic circuit. In step a5 a 1 (step a6) is added to A-B-1 in order to get A-B (step a7).

In step a8 the result A-B from step a7 is further evaluated and the most significant bit or sign of A-B is determined. The calculation of the absolute difference ends in step a12 if the most significant bit is 1. If, however, the most significant bit is not 1 another two's complement arithmetic is executed in steps a9, a10, and a11. First a bitwise complement is calculated in step a9 and a 1 (step a11) is added by an adder logic (step a10), for example by using a 16-bit adder logic circuit. Then the calculation of the absolute difference ends in step a12.

The threshold can be determined manually, e.g. by evaluating statistics logged by the optical sensor arrangement running with a static background (i.e. no motion) and choosing a threshold slightly above the maximum value encountered when taking numerous samples with no motion in the field of view of the optical sensor. The threshold mainly accounts for random noise. This method works fine and would be a one-time operation if used, e.g. in an office environment where the ambient light and static environment never changes much. This mimics the way that many PIR detectors are calibrated to a static environment.

However in a situation where the ambient light changes (e.g. a room with a window where the lighting conditions change during the day, or one of the light bulbs burns out etc.), it would be prudent to have an auto-calibration routine to automatically determine the threshold. Even though the threshold essentially is compared with a difference of sensor frames, the background noise power may increase as ambient light level increases such that if a light bulb burns out in the office, there will be less signal, rendering the motion detection slightly less sensitive.

A threshold can be found automatically by taking, e.g. a median, or an average value obtained in a series of samples, then adding one or more standard deviations to obtain the threshold. The average value is easier to calculate on silicon than the median value. Alternative approaches may offer even further improved sensitivity, although the median approach can still outperform conventional active proximity sensor devices in detecting motion, while operating passively, i.e. no LED and less power consumption. More robust algorithms analyse data and discern periods of minimum motion signal and then accurately determine an optimum threshold that would render maximal sensitivity.

A robust method of automatically selecting the threshold value is to compute the "mode" of a distribution of sensor frames, where it is assumed that the system encounters brief periods of inactivity (no motion). Because motion events typically create responses much larger than the sensor signal encountered in a static environment. Even with occasional motion disturbances in an environment that is usually unchanging, it is possible to discern what an appropriate threshold can be. However, computing the "mode" of a distribution may not be so easy to do with hardware components.

FIG. 6 shows an embodiment of an auto-calibration routine for determining a threshold value. The flowchart summarizes an auto calibration routine which involves computing the mode of a distribution which can be implemented as hardware or software.

The auto calibration routine involves accumulating a histogram of sensor frames (starting with step h1). In step h2 a set of histogram bins bin0, bin1, . . . , bin7 are set to zero, i.e. zero counts. The number of sensor frames to include can be adjusted and is set to an integer number N in step h2. Furthermore, a number of frames f # to be included into the histogram is set to an integer number.

In step h3 an initial sensor frame Red_Count, Green_Count, Blue_Count, Clear_Count is read from the optical sensor and saved as previous frame in step h4, i.e. Red_Save=Red_Count, Green_Save=Green_Count, Blue_Save=Blue_Count, Clear_Save=Clear_Count. In step h5 a new current frame Red_Count, Green_Count, Blue_Count, Clear_Count is read from the optical sensor. Then, the motion parameter M is calculated for the pair of previous and current frame (step h6), i.e.

$$M = abs(Red\_Count - Red\_Save) + abs(Green\_Count - Green\_Save) + abs(Blue\_Count - Blue\_Save) + 1/2 \cdot abs(Clear\_Count - Clear\_Save).$$

In step h7 the resulting motion parameter M is divided by the BinSize in order to determine which histogram bin, i.e. bin0, bin1, . . . , bin7, to increment. Correspondingly, the number of frames f # parameter is decremented by 1. Step h8 checks whether the number of frames f # parameter is zero. If not the method returns to step h4 and accumulates additional sensor data. If number of frames f # parameter is zero the accumulation of the histogram terminates in step h10.

In this embodiment the size of the bins BinSize, i.e. bin0, bin1, . . . , bin7, is set depending on a maximum bin size BinSizeMax. This parameter can be set to an anticipated value under no motion condition (see step b1). The size of the bins BinSize is determined in see step b2, as BinSizeMax/8 if the sensor frames are to be grouped into 8 bins, for example. The BinSize can be obtained by doing a shift of BinSizeMax by 3 bit positions, for example. Using a right shift in binary registers provides an efficient way of doing integer division by powers of two.

After accumulation of the histogram has been terminated in step h10 steps b3 to b9 are executed and the histogram is analysed in order to determine the threshold value $M_{thr}$. Basically, the analysis involves a method for approximating the mode of the previously determined histogram. As a first step a counter K is initially set to zero (step b3). The counter is an integer number and relates to the number of bins. In the present embodiment 8 bins are defined, i.e. bin0, bin1, . . . , bin7. In this case K counts from 0, 1, . . . , to 7. In step b5 the number of counts Delta of a current bin Bin_K+1 is compared with a previous bin Bin_K, i.e.

$$Delta = Bin\_K+1 - Bin\_K.$$

Step b6 determines whether the current bin has more counts than the previous bin. If Delta>0 then the counter K is incremented in step b4 and a new Delta of respective current and previous bins is calculated. If Delta<0 then mode X of the histogram is determined as $$X = K * BinSize.$$

The threshold value $M_{thr}$ is assumed to be $$M_{thr} = s * X,$$

where s is an arbitrary multiplicative factor. For example, multiplicative factor s can be an integer number of a standard deviation of the histogram. Typically, the multiplicative factors is set after some training and data acquisition in an environment where the optical sensor arrangement is to be used. Finally, in step b9 the adjusted threshold is provided and can be read out during the motion detection procedure.

Figure 7:
FIG. 7 shows an exemplary histogram of sensor frames with intermittent motion during sensor data acquisition.

FIG. 7 shows an exemplary histogram of sensor frames with intermittent motion during sensor data acquisition. In fact, the drawing shows an actual histogram taken in a cubical with occasional motion/activity occurring. The histogram can be used to illustrate the auto calibration routine introduced with respect to FIG. 6 above. The histogram depicts the bin number K on the x-axis and frequency fin counts depicted in the y-axis.

After accumulation of the histogram in FIG. 7 the analysis is executed as described above. Basically, the routine counts the number of events (i.e. frequency of) e.g. one count, two counts etc. Now starting at the left bin0 in the histogram (one count) look at the next bin1 (two counts), for example. If there are more incidences or events having two counts than there are incidences having just one count (see Delta above), then proceed on. Then compare how many incidences or events have three counts, and compare these to how many events have two counts. In the example of FIG. 7 there are more samples with three counts than with two counts. So the routine moves on one more step (increment counter K). There are now less samples having four counts than samples having three counts. The auto calibration routine concludes that the mode X is three counts.

Another way of summarizing the auto calibration routine is to acquire the histogram, then compare histogram entries as distributed in the bins bin0, bin1, . . . , bin7 starting at the left of at bin0 and working towards the right to bin7, until a decrease in the difference (see Delta above) is detected. In other words the routine finds a peak of the histogram by evaluating the derivative (or slope) until the slope finally goes negative.

Figure 8:
FIG. 8 shows an exemplary histogram of sensor frames with no intermittent motion during sensor data acquisition.

FIG. 8 shows an exemplary histogram of sensor frames with no intermittent motion during frames of sensor data acquisition. The histogram depicts a real sampled sensor data taken with the same conditions as FIG. 7, but with no motion occurring during the sampling. In this case the maximum signal was "8" counts, such that with a mode of "3" counts, using Mthr=4*3=12 would provide a very robust threshold that would not trigger false motion events.

Other variations (not shown) could be to first find the mode X, and exclude all samples that exceed 4*mode, then compute the standard deviation of these samples, then set the threshold Mthr equal to the mean of the remaining sample population, plus several standard deviations. Many other statistical methods of determining an optimal threshold are possible. Robust methods have shown to work fine and result in motion/presence detection distances that far exceed what common active optical proximity can achieve. Typically, including an auto calibration routine as discussed above to determine a lower threshold, much higher detection distances can be achieved. Please note that the results summarized in FIGS. 7 and 8 are actual tests that were done using no lens, with the result that we could actually detect motion of a body at distances up to a couple of meters or feet. The optical sensor arrangement was pointed at a wall of a cubicle and illuminated by the existing office lights. Adding a dedicated lens to the optical sensor arrangement can be shown to further extend detection distances. The results presented above were obtained in a cubicle environment with windows and care was taken not to have the window in the field of view of the optical sensor. Thus, the results were solely taken with reflected light. If an object interrupts the path between a light source and the detector, then obviously detection will be much more sensitive even at larger distances.

Motion on a monitor screen, e.g. moving colored screen saver patterns, in a dark office could be detected by the optical sensor arrangement, eventually resulting in a false motion-event trigger. The threshold value can be set to account for such an event. In general it is safe to assume that the ambient light environment is significantly brighter than other "non-static" light sources such as computer monitors with animated screens.

Figure 9:
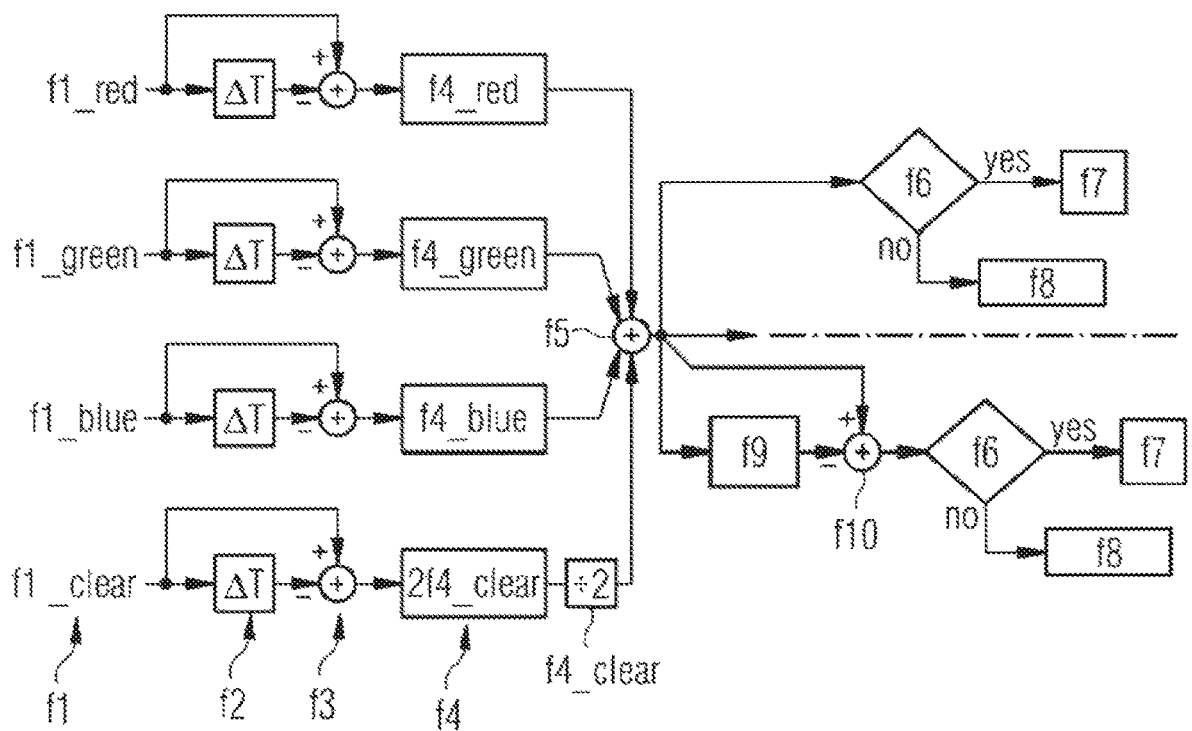
FIG. 9 shows an embodiment of an adaptive method for establishing an adaptive baseline.

FIG. 9 shows an embodiment of an adaptive method for establishing an adaptive baseline. There are environments with changing lighting conditions such as in a room with a lot of windows, because the outdoor light could be changing quickly due to passing clouds, and other similar phenomenon. In this further embodiment a low-pass smoothing filter provides an adaptive baseline for the threshold value Mthr as shown in the drawing.

In a first step f1, the components of a given tuple of sensor data or sensor are processed separately in dedicated processing channels f1_red, f1_green, f1_blue, f1_clear, respectively. In step f2 processing the tuple components is delayed such that in step f3 a component from a current sample is subtracted (or added) to a component from a previous sample, respectively. In step f4 respective absolute values f4_red, f4_green, f4_blue, and 2f4_clear are determined from each of the added components. Please note that the absolute value 2f4_clear is additionally divided by two to result in f4_clear. The resulting absolute values f4_red, f4_green, f4_blue and f4_clear are added in step f5 to result in motion parameter M.

The embodiment of steps f1 to f5 correspond to evaluating a metric function as discussed above and the motion parameter M can be compared with the threshold value $M_{thr}$ in step f6 resulting either in the detection of a motion event in step f7 or starting another loop in step f8. In order to achieve an adaptive baseline, however, filtering steps f9 and f10 are executed before comparison according to steps f6, f7 and f8.

In step f9 motion parameter M is digitally filtered by means of a smoothing filter having a long time constant. In step f10 the filtered motion parameter and the unfiltered motion parameter M are subtracted by means of an adder.

The proposed steps f9 and f10 implement an infinite impulse response (IIR) digital filter and provide an efficient way of achieving a smoothing filter that achieves a very long time-constant while requiring a minimum of memory, such that it could be built into hardware components if desired. By comparing the current sample to the output of the smoothed IIR filter, abrupt changes in light levels can be detected that signify motion. A static baseline, however, can be used in an interior room/hallway with stable static lighting.

The proposed method may be considered a passive motion detection and relies on ambient light. Another embodiment (not shown) could utilize a built-in light source such as an existing IR LED in an active proximity module. A white LED or other broadband device can be used together with a multi-channel color sensor as these sensor type provides enhanced sensitivity for detecting moving bodies against a constant background. The difference in operation using an LED, is that we would not attempt to subtract out ambient light like the normal active proximity detection does. Instead of taking a frame with the LED on, following with a frame with the LED off and subtracting the difference, the LED could be left on during successive frames, then subtract the frames to look for motion, i.e. a difference in time.

The invention claimed is:

1. A method for passive optical motion detection using an optical sensor arrangement comprising an optical sensor having at least one signal channel, the method comprising the steps of:
   initializing the optical sensor arrangement for repeated signal acquisition,
   acquiring an initial frame comprising a tuple of sensor data collected from the at least one signal channel,
   setting the initial frame as a previous frame, and
   entering a loop of motion detection, wherein the loop comprises a repeated execution of the following steps:
      acquiring a current frame comprising another tuple of sensor data collected from the at least one signal channel,
      computing a motion parameter from a motion metric depending on the current and previous frames,
      comparing the computed motion parameter with a threshold value,
      wherein:
         the threshold value is set manually by estimating a random noise in the sensor data, or
         the threshold value is set automatically in an auto-calibration routine depending on a lighting condition, wherein the auto-calibration routine comprises:
            determining a threshold parameter by taking a median or average of a predetermined number of successive frames of sensor data,
            calculating a standard deviation of the threshold parameter, and
            defining the threshold value as a sum of the threshold parameter and one or more standard deviations,
      setting a motion event parameter depending on the comparison of the motion parameter with the threshold value, and
      setting the current frame as previous frame.

2. The method according to claim 1, wherein
the optical sensor comprises multiple signal channels,
the collected tuples of sensor data comprise multiple components each associated to one of the multiple signal channels, and wherein
the step of computing the motion parameter is done by evaluating the motion metric component-by-component.

3. The method according to claim 1, wherein the motion metric comprises taking an absolute difference of the tuples of current and previous frames.

4. The method according to claim 3, wherein the motion parameter resulting from evaluating the motion metric component-by-component is summed.

5. The method according to claim 1, wherein the motion metric comprises taking a square root of a squared absolute difference of the tuples of current and previous frames.

6. The method according to claim 1, wherein the motion metric comprises taking a squared difference of the tuples of current and previous frames.

7. The method according to claim 1, wherein
the motion event parameter is set to indicate the motion event if the motion parameter is greater or equal than the threshold value and
the motion event parameter is set to not indicate the motion event if the motion parameter is smaller than the threshold value.

8. The method according to according to claim 1, wherein
the computed motion parameter is filtered with a smoothing filter and subtracted from the computed motion parameter to gain a filtered motion parameter, and wherein
the filtered motion parameter is defined as motion parameter and compared to the threshold value.

9. A computer program product comprising a program code to be executed in a control unit connected to an optical sensor, wherein when executed the program code performs the method for passive optical motion detection according to claim 1.

10. A method for passive optical motion detection using an optical sensor arrangement comprising an optical sensor having at least one signal channel, the method comprising the steps of:
initializing the optical sensor arrangement for repeated signal acquisition,
acquiring an initial frame comprising a tuple of sensor data collected from the at least one signal channel,
setting the initial frame as a previous frame, and
entering a loop of motion detection, wherein the loop comprises a repeated execution of the following steps:
acquiring a current frame comprising another tuple of sensor data collected from the at least one signal channel,
computing a motion parameter from a motion metric depending on the current and previous frames,
comparing the computed motion parameter with a threshold value,
wherein:
the threshold value is set manually by estimating a random noise in the sensor data, or
the threshold value is set automatically in an auto-calibration routine depending on a lighting condition, wherein the auto-calibration routine comprises:
determining the threshold parameter by taking a mode of a predetermined number of successive frames of sensor data, and
defining the threshold value as the mode or as a multiple of the mode,
setting a motion event parameter depending on the comparison of the motion parameter with the threshold value, and
setting the current frame as previous frame.

11. The method according to claim 10, wherein the auto-calibration routine comprises:
accumulating a histogram of successive motion parameters,
determining a peak value in the histogram, and
setting the peak value as mode of the predetermined number of successive frames of sensor data.

12. An optical sensor arrangement for passive motion detection, comprising:
an optical sensor configured, during operation, to acquire consecutive frames of sensor data, the optical sensor having at least one signal channel, and
a control unit connected to the optical sensor and configured, during operation, to perform operations comprising:
initialize the optical sensor arrangement for repeated signal acquisition,
acquire an initial frame comprising a tuple of sensor data collected from the at least one signal channel,
set the initial frame as a previous frame, and
enter a loop of motion detection, wherein the loop comprises a repeated execution of the following steps:
acquiring a current frame comprising another tuple of sensor data collected from the at least one signal channel,
computing a motion parameter from a motion metric depending on the current and previous frames,
comparing the computed motion parameter with a threshold value,
wherein:
the threshold value is set manually by estimating a random noise in the sensor data, or
the threshold value is set automatically in an auto-calibration routine depending on a lighting condition, wherein the auto-calibration routine comprises:
determining a threshold parameter by taking a median or average of a predetermined number of successive frames of sensor data,
calculating a standard deviation of the threshold parameter, and
defining the threshold value as a sum of the threshold parameter and one or more standard deviations,
setting a motion event parameter depending on the comparison of the motion parameter with the threshold value, and
setting the current frame as previous frame.

13. The optical sensor arrangement according to claim 12, wherein the optical sensor comprises a single signal channel sensor, a multiple signal channel sensor, or an array of several single and/or multiple signal channel sensors, in particular one or more gesture sensors or one or more color sensors.

14. The optical sensor arrangement according to claim 12, wherein the control unit comprises a micro-controller, an application-specific integrated circuit, a signal processor, and/or a logic array configured to perform the operations.

15. The optical sensor arrangement of claim 12, wherein the motion metric is defined as a function of tuples of the consecutive frames of sensor data.

\* \* \* \* \*